US010403251B1

United States Patent
Escamilla

(10) Patent No.: US 10,403,251 B1
(45) Date of Patent: Sep. 3, 2019

(54) SYSTEM AND METHOD OF COLLECTIVELY PRODUCING MUSIC

(71) Applicant: Joseph Robert Escamilla, San Antonio, TX (US)

(72) Inventor: Joseph Robert Escamilla, San Antonio, TX (US)

( * ) Notice: Subject to any disclaimer, the term of this patent is extended or adjusted under 35 U.S.C. 154(b) by 0 days.

(21) Appl. No.: 16/058,459

(22) Filed: Aug. 8, 2018

(51) Int. Cl.
| | | |
|---|---|---|
| G06F 3/16 | (2006.01) | |
| G10H 1/00 | (2006.01) | |
| G06F 3/0482 | (2013.01) | |
| H04L 29/06 | (2006.01) | |
| G06F 16/64 | (2019.01) | |

(52) U.S. Cl.
CPC ......... *G10H 1/0008* (2013.01); *G06F 3/0482* (2013.01); *G06F 3/165* (2013.01); *G06F 16/64* (2019.01); *H04L 65/403* (2013.01); *G10H 2220/096* (2013.01); *G10H 2220/101* (2013.01); *G10H 2240/131* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 8,255,552 B2* | 8/2012 | Witt | ......................... | H03M 7/30 | |
| | | | | | 709/231 |
| 8,799,071 B2* | 8/2014 | Gruber | ................... | G06Q 10/06 | |
| | | | | | 705/14.49 |
| 9,763,592 B2* | 9/2017 | Le | ......................... | A61B 5/0482 | |
| 10,054,911 B2* | 8/2018 | Scheckelhoff | ........ | H04L 12/282 | |
| 10,116,760 B2* | 10/2018 | Chan | ...................... | H04W 4/023 | |
| 2001/0007960 A1* | 7/2001 | Yoshihara | ............ | G10H 1/0025 | |
| | | | | | 700/94 |
| 2008/0190271 A1* | 8/2008 | Taub | .................... | G10H 1/0058 | |
| | | | | | 84/645 |
| 2009/0106429 A1* | 4/2009 | Siegal | .................... | G06Q 10/00 | |
| | | | | | 709/227 |
| 2010/0305732 A1* | 12/2010 | Serletic | ................. | G06F 3/0481 | |
| | | | | | 700/94 |
| 2010/0326256 A1* | 12/2010 | Emmerson | ........... | G10H 1/0025 | |
| | | | | | 84/610 |
| 2012/0096371 A1* | 4/2012 | D'Anna | ................. | G06Q 10/06 | |
| | | | | | 715/756 |
| 2013/0132833 A1* | 5/2013 | White | ..................... | G06F 3/048 | |
| | | | | | 715/704 |
| 2014/0000438 A1* | 1/2014 | Feis | ........................ | G10G 1/00 | |
| | | | | | 84/453 |

(Continued)

*Primary Examiner* — Hien L Duong

(57) ABSTRACT

A system and a method of collectively producing music requires a set of user account that are managed by at least one remote server acting as a hub to exchange ideas and information about a music project. An originator of the music project is able to select other users to specifically collaborate on the music project. The originator and the collaborative users each need to have a user account. A communication platform provides the originator and the collaborative users with a medium to share constructive feedback in real-time about the music project. In addition, the originator and the collaborative users are provided with a set of digital tools that can be found in a modern audio workstation. This allows the originator and the collaborative users to share constructive feedback with each other and then to audibly edit the music project with any tool from the set of digital tools.

14 Claims, 17 Drawing Sheets

(56) References Cited

U.S. PATENT DOCUMENTS

| | | | |
|---|---|---|---|
| 2014/0040119 A1* | 2/2014 | Emmerson | G10H 1/0025 |
| | | | 705/39 |
| 2014/0173446 A1* | 6/2014 | Lee | H04L 41/22 |
| | | | 715/736 |
| 2014/0280589 A1* | 9/2014 | Atkinson | H04L 65/403 |
| | | | 709/204 |
| 2014/0365018 A1* | 12/2014 | Kusukame | G05D 23/1917 |
| | | | 700/276 |
| 2015/0154562 A1* | 6/2015 | Emmerson | G06Q 10/101 |
| | | | 705/59 |
| 2015/0169694 A1* | 6/2015 | Longo | H04W 4/21 |
| | | | 707/724 |
| 2016/0085846 A1* | 3/2016 | Smith | G06Q 10/10 |
| | | | 705/12 |
| 2016/0195859 A1* | 7/2016 | Britt | H04W 4/80 |
| | | | 700/275 |
| 2016/0198536 A1* | 7/2016 | Britt | H02J 7/0042 |
| | | | 315/149 |
| 2016/0226732 A1* | 8/2016 | Kim | H04L 12/2807 |
| 2017/0084143 A1* | 3/2017 | Acera | G08B 13/19684 |
| 2017/0142458 A1* | 5/2017 | Watanabe | H04N 21/252 |
| 2017/0169341 A1* | 6/2017 | Tang | G06F 17/30 |
| 2017/0206571 A1* | 7/2017 | Dhawan | G06Q 30/0281 |

* cited by examiner

US 10,403,251 B1

SYSTEM AND METHOD OF COLLECTIVELY PRODUCING MUSIC

FIELD OF THE INVENTION

The present invention generally relates to a social media platform that allows users to interact together through time on songs and collaborations. More specifically, the present invention uses a live online platform to allow a user to create music through instantaneous collaboration with other users, regardless of time or location.

BACKGROUND OF THE INVENTION

Typically, the production of music is accomplished with a single person or a small group of people. This person or small group of people is usually experienced professionals, which have had some success in the music production industry as well as proficient at producing new music. However, music generated by these experienced professionals can often grow to be audibly stale as the techniques implemented by these experienced professionals are repetitiously used in producing new music. In addition, newcomers of the music production industry are better able to create audibly-fresh new music, but those newcomers do not typically have enough experience to proficiently produce new music.

Therefore, an objective of the present invention is to provide a social network that is catered to allow users to collaborate with each other in real-time in order to produce newly-created music. This objective allows for a mix of experienced professionals and newcomers to work together. Another objective of the present invention is to provide users with a complete digital audio workstation in order to audibly edit new music. This objective exposes newcomers to all of the tools in a modern audio workstation. Another objective of the present invention is to provide a library of communal sounds in order to compile and/or append into the new-created music. Another objective of the present invention is to provide a social media platform that a user can share their newly-created music with other users.

DETAILED DESCRIPTION OF THE INVENTION

All illustrations of the drawings are for the purpose of describing selected versions of the present invention and are not intended to limit the scope of the present invention.

Figure 1:
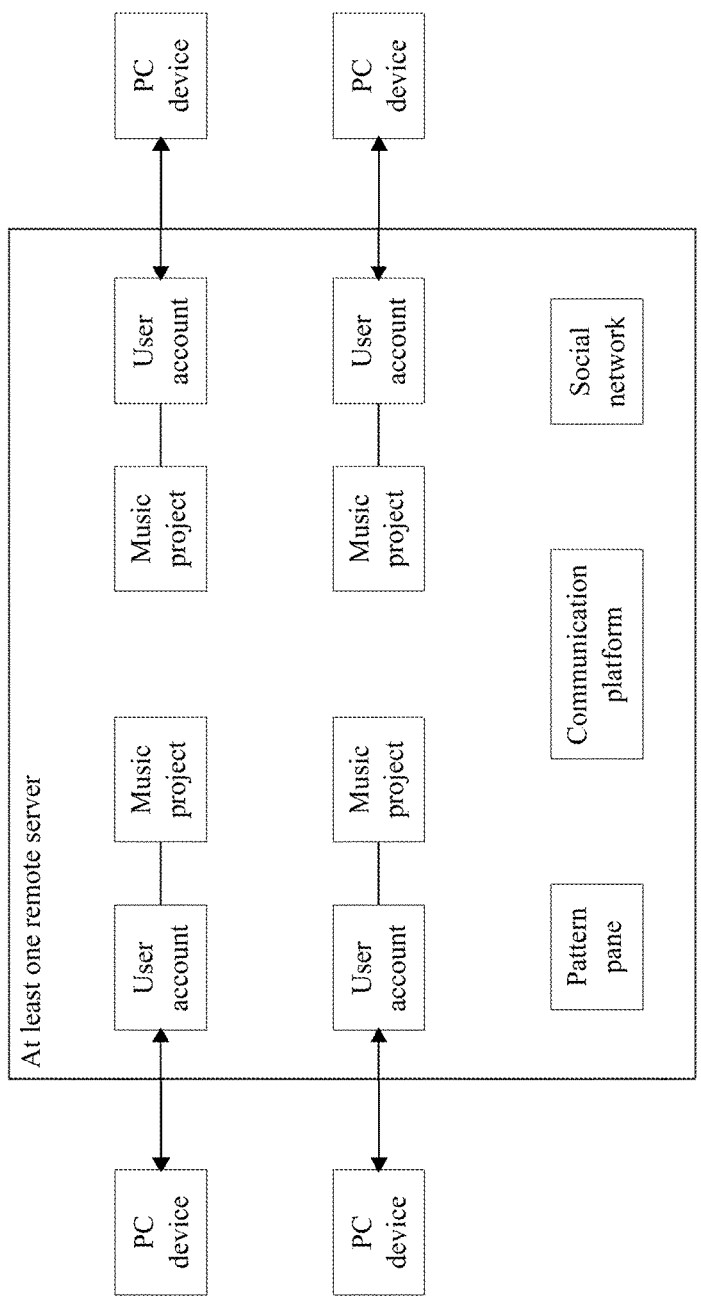
FIG. 1 is a block diagram illustrating the system of the present invention.

The present invention is a system and a method of collectively producing music, which allows for people to interact and collaborate with each other on a social media platform. In other words, the present invention allows people to create music together through instantaneous online communication that can be made regardless of time or location. The system for the present invention is provided with at least one remote server that manages a plurality of user accounts, which is shown in FIG. 1. The user accounts allow the present invention to uniquely identify each person that is using and interacting with the present invention. In addition, a user account may be verified through a third-party website (e.g. Facebook, Google, etc.) and may be associated to at least one user-selected genre. The remote server is used as a hub to exchange information between the user accounts and is used to manage the administrative processes of the present invention. Moreover, each user account is associated with a corresponding personal computing (PC) device and at least one music project (Step A). The corresponding PC device allows each person with a user account to interact and use the present invention. The corresponding PC device can be, but is not limited to, a desktop, a laptop, a smart-phone, or a tablet personal computer. The music project is the music that each person wants to be collaborated on by other people through the present invention. Moreover, a user account may manage a plurality of music projects, each of which can kept private or publicly collaborated on by other user accounts. The system for the present invention is also provided with a plurality of audio-editing tools that are managed by the remote server (Step B). The audio-editing tools acts as a kind of digital audio workstation, which allows each person with a user account to collaboratively edit a music project.

Figure 2A:
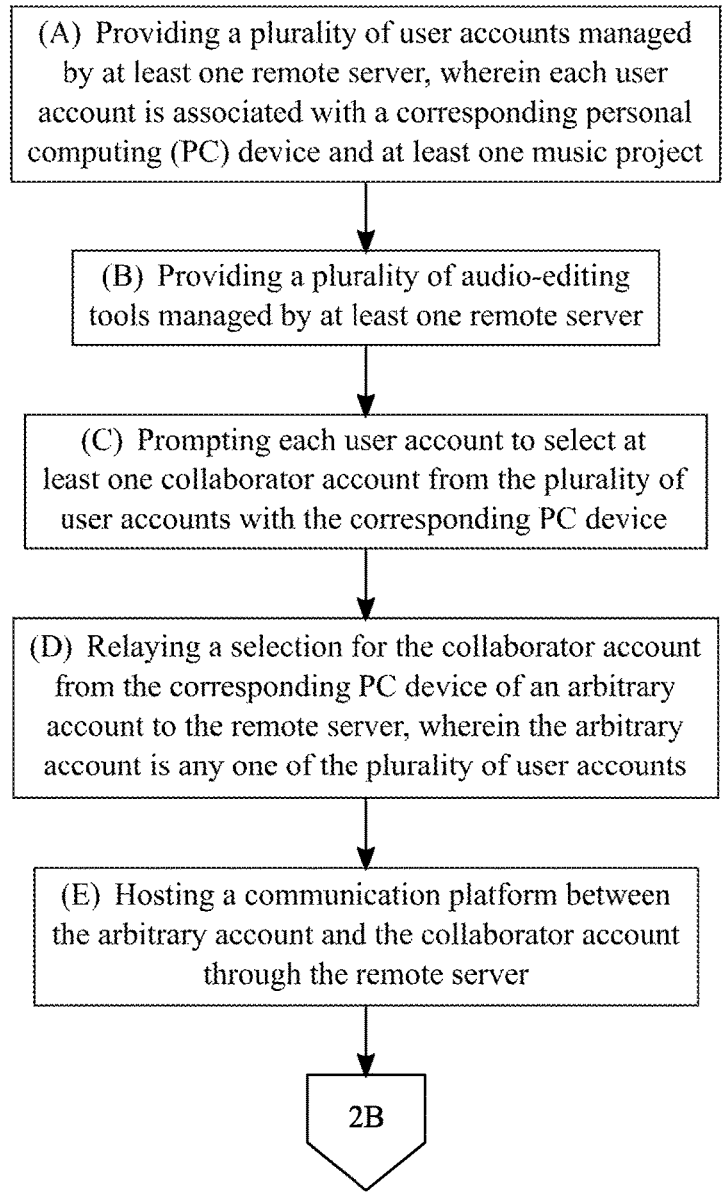
FIG. 2A is a flowchart illustrating the overall process for the method of the present invention.
Figure 2B:
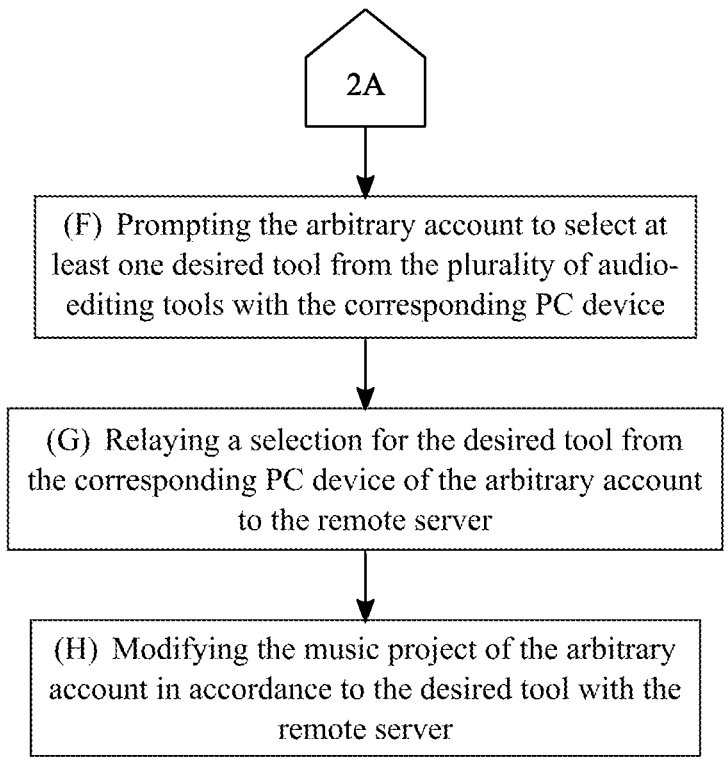
FIG. 2B is a continuation of the flowchart illustrated in FIG. 2A.

As can be seen in FIGS. 2A and 2B, an overall process followed by the method of the present invention allows each user account to engage in communication or audio-editing with any other user account for their music project. The overall process begins by prompting each user account to select at least one collaborator account from the plurality of user accounts with the corresponding PC device (Step C).

Hereinafter, an arbitrary account refers any single account from the plurality of user accounts. A collaborator account is a user account that the arbitrary account selects to work together on a music project. The overall process continues by relaying a selection for the collaborator account from the corresponding PC device of the arbitrary account to the remote server (Step D), which allows the remote server to be aware of the selection of the collaborator account. The remote server can then host a communication platform between the arbitrary account and the collaborator account (Step E) so that the arbitrary account and the collaborator account are able to exchange ideas and information about a music project with each other. The communication platform can be, but is not limited to, a messaging forum board and/or a real-time chat-box.

The overall process continues by prompting the arbitrary account to select at least one desired tool from the plurality of audio-editing tools with the corresponding PC device (Step F). The desired tool is most likely the audio-editing tool that was discussed between the arbitrary account and the collaborator account during Step E. Once the selection of the desired tool is relayed from the corresponding PC device of the arbitrary account to the remote server (Step G), the remote server is then able to modify the music project of the arbitrary account in accordance to the desired tool (Step H). Consequently, the arbitrary account is able to communicate feedback for a music project with the collaborator account and is able to audibly edit the music project according to that feedback during the course of the overall process. In an alternative embodiment of the present invention, the user of the collaborator account can also select and execute a specific audio-editing tool on the music project of the arbitrary account in the same manner that the arbitrary account did in Step F, Step H, and Step G.

Figure 3:
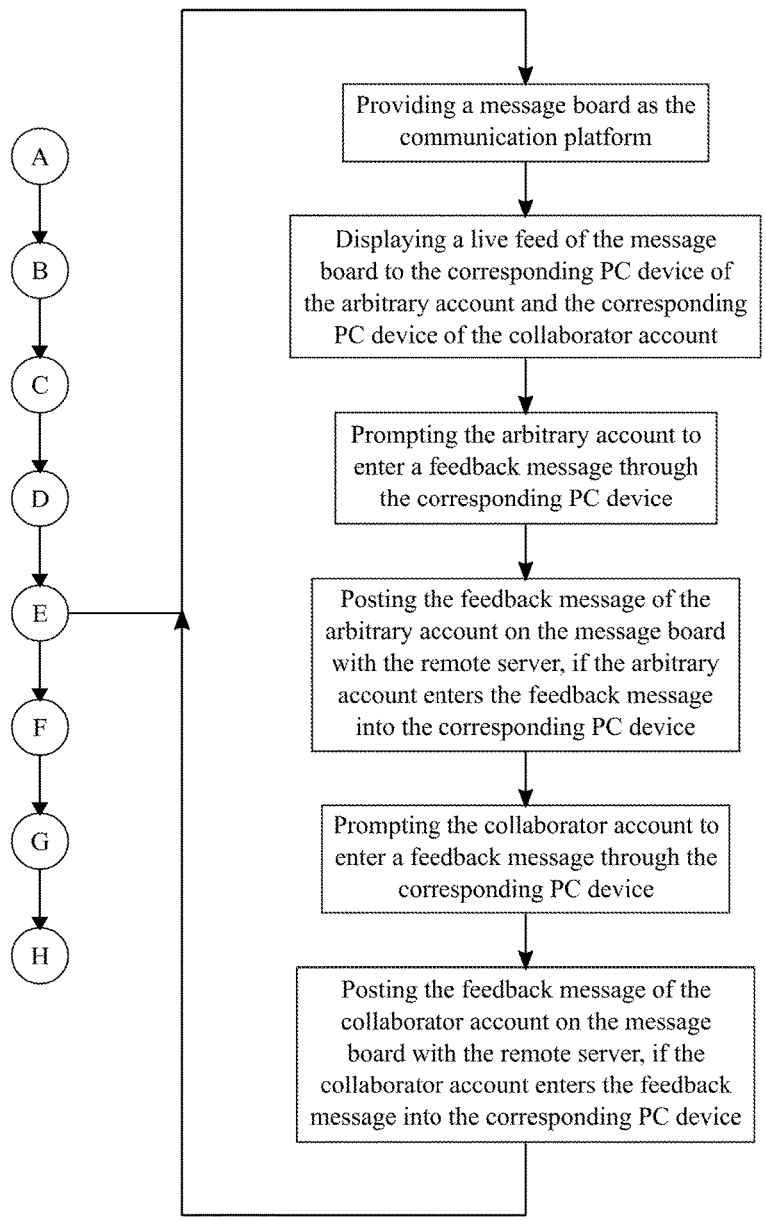
FIG. 3 is a flowchart illustrating a sub-process of managing a communication platform.

A sub-process followed by the method of the present invention provides a message board as the communication platform, which is shown in FIG. 3. The message board is a graphical interface that is continuously updated with communications between people working on a music project through the present invention. More specifically, this sub-process begins by displaying a live feed of the message board to the corresponding PC device of the arbitrary account and the corresponding PC device of the collaborator account, which allows the people communicating to each other as the arbitrary account and the collaborator account to have a real-time discussion about a music project. The communication platform is able to prompt the arbitrary account to enter a feedback message through the corresponding PC device. Once the arbitrary account enters a feedback message into the corresponding PC device, the remote server posts the feedback message on the message board so that the collaborator account is able to view the feedback message from the arbitrary account. Similarly, the communication platform is able to prompt the collaborator account to enter a feedback message through the corresponding PC device. Once the collaborator account enters a feedback message into the corresponding PC device, the remote server posts the feedback message on the message board so that the arbitrary account is able to view the feedback message from the collaborator account. This ongoing communication between people using the arbitrary account and the collaborator account through the present invention allows these people to discuss a music project while simultaneously having the ability to audibly edit the music project.

Figure 4:
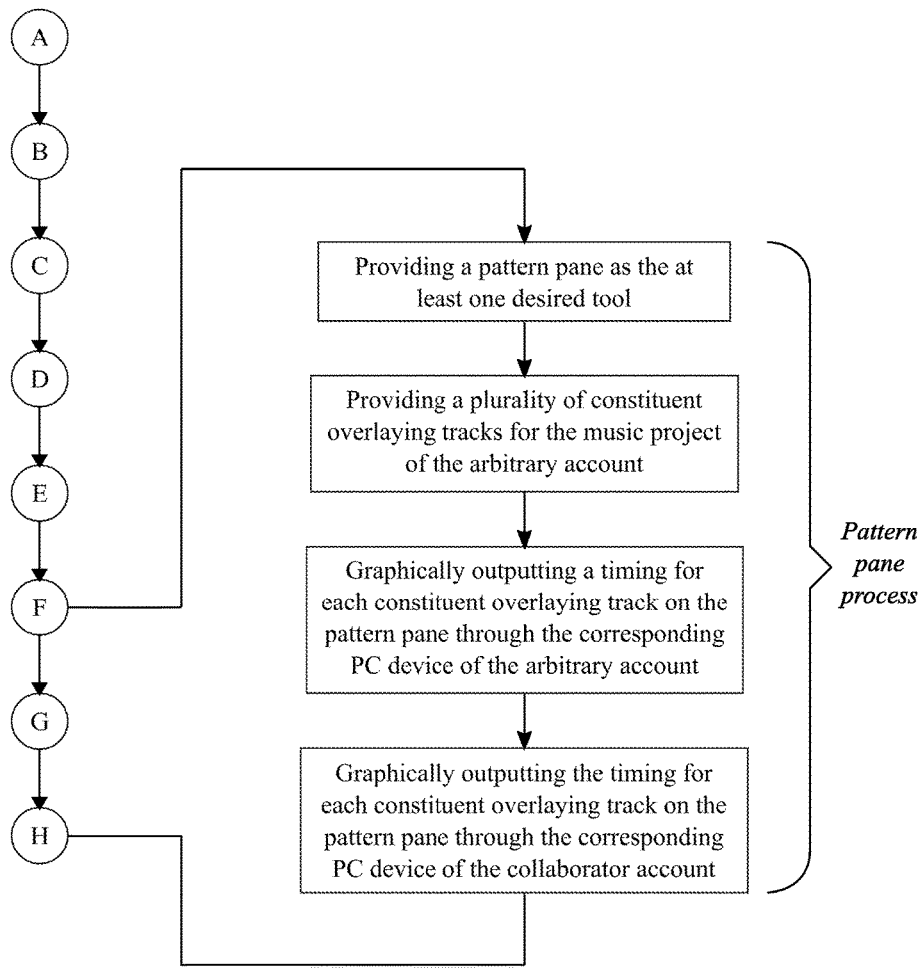
FIG. 4 is a flowchart illustrating a sub-process of managing a pattern pane that is graphically displaying a plurality of constituent overlaying tracks.

A sub-process followed by the method of the present invention provides a pattern pane as the at least one desired tool, which is shown in FIG. 4. The pattern pane is a graphical user interface that allows user to view a plurality of constituent overlaying tracks for a music project. The pattern pane is also display some musical analytics of the music project such as key signature, running time, and time signature. The constituent overlaying tracks are the parts that are audibly combined to form the music project. Thus, the corresponding PC device of the arbitrary account is used to graphically output a timing of each constituent overlaying track on the pattern pane so that the person using the arbitrary account is able to visualize the timing of each constituent overlaying track during the playing length of the music project. Similarly, the corresponding PC device of the collaborator account is used to graphically output a timing of each constituent overlaying track on the pattern pane so that the person using the arbitrary account is able to visualize the timing of each constituent overlaying track during the playing length of the music project.

Figure 5:
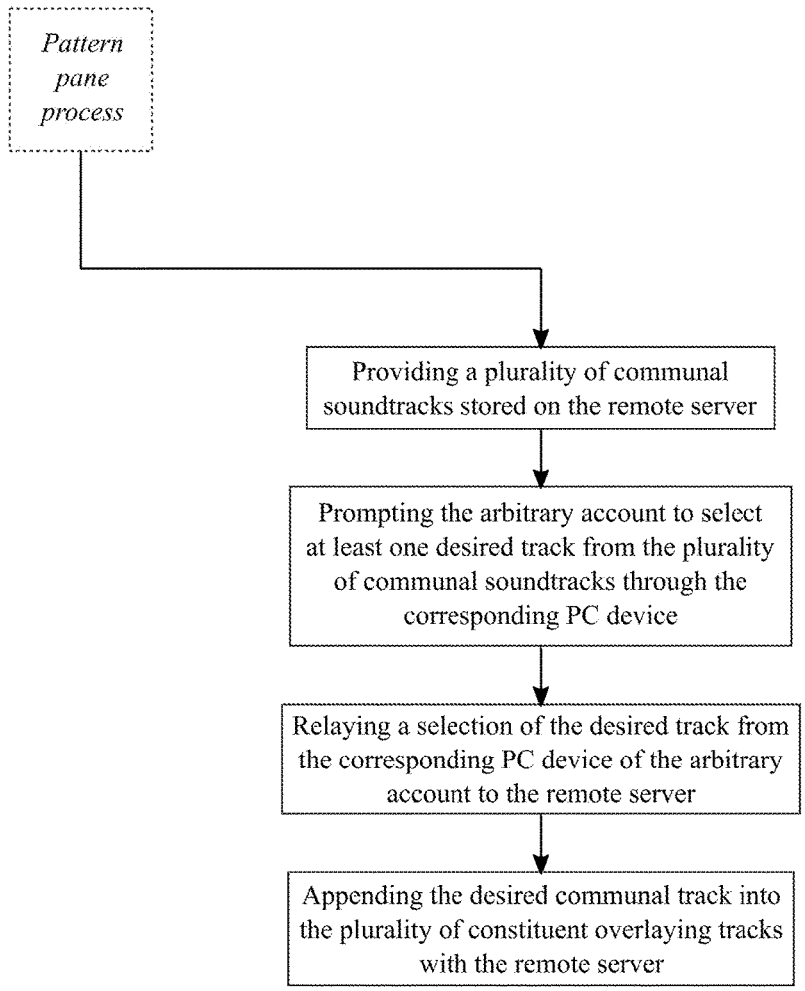
FIG. 5 is a flowchart illustrating a sub-process of appending a communal track into the constituent overlaying tracks.

Another feature of the pattern pane allows for new soundtracks to be appended into the existing set of constituent overlaying tracks for a music project. As can be seen in FIG. 5, one way to append new soundtracks into the music project is to have a plurality of communal soundtracks stored on the remote server. The communal soundtracks are soundtracks that can be accessed by or listened to any user account. The communal soundtracks include, but are not limited to, bass tracks, drum-kit tracks, electronic drum-kit tracks, guitar tracks, mallet tracks, orchestral tracks, percussion tracks, piano tracks, and synthesizer tracks. In order to access the communal soundtracks, the corresponding PC device prompts the arbitrary account to select at least one desired communal track from the plurality of communal soundtracks. Once a selection for the desired communal track is relayed from the corresponding PC device of the arbitrary account to the remote server, the remote server appends the desired communal track into the plurality of constituent overlaying tracks, which audibly edits the music project of the arbitrary account.

Figure 6:
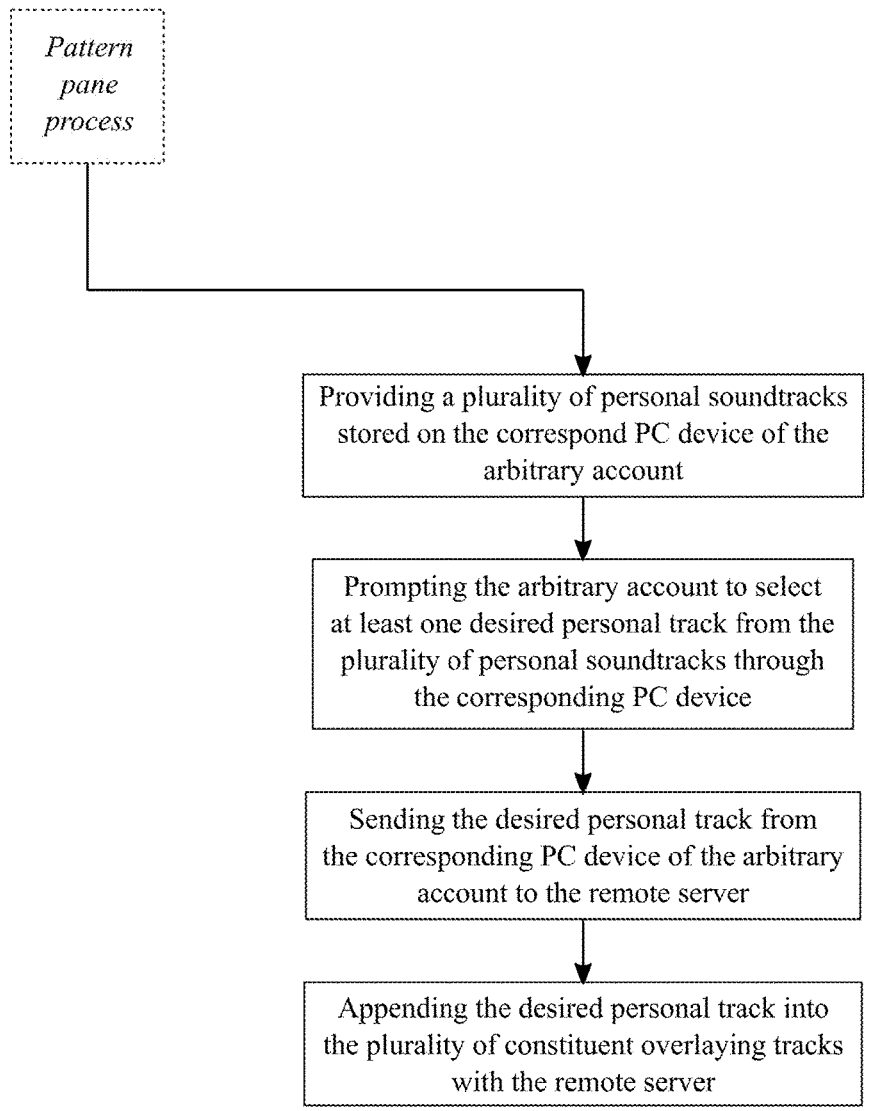
FIG. 6 is a flowchart illustrating a sub-process of appending a personal track into the constituent overlaying tracks.

As can be seen in FIG. 6, another way to append new soundtracks into the music project is to use a plurality of personal soundtracks stored on the corresponding PC device of the arbitrary account. The personal soundtracks are soundtracks that are that can be only accessed by or only listened to a specific user account. In order to access the personal soundtracks, the corresponding PC device prompts the arbitrary account to select at least one desired personal track from the plurality of personal soundtracks. Once the desired personal track is sent from the corresponding PC device of the arbitrary account to the remote server, the remote server appends the desired personal track into the plurality of constituent overlaying tracks, which also audibly edits the music project of the arbitrary account.

Figure 7:
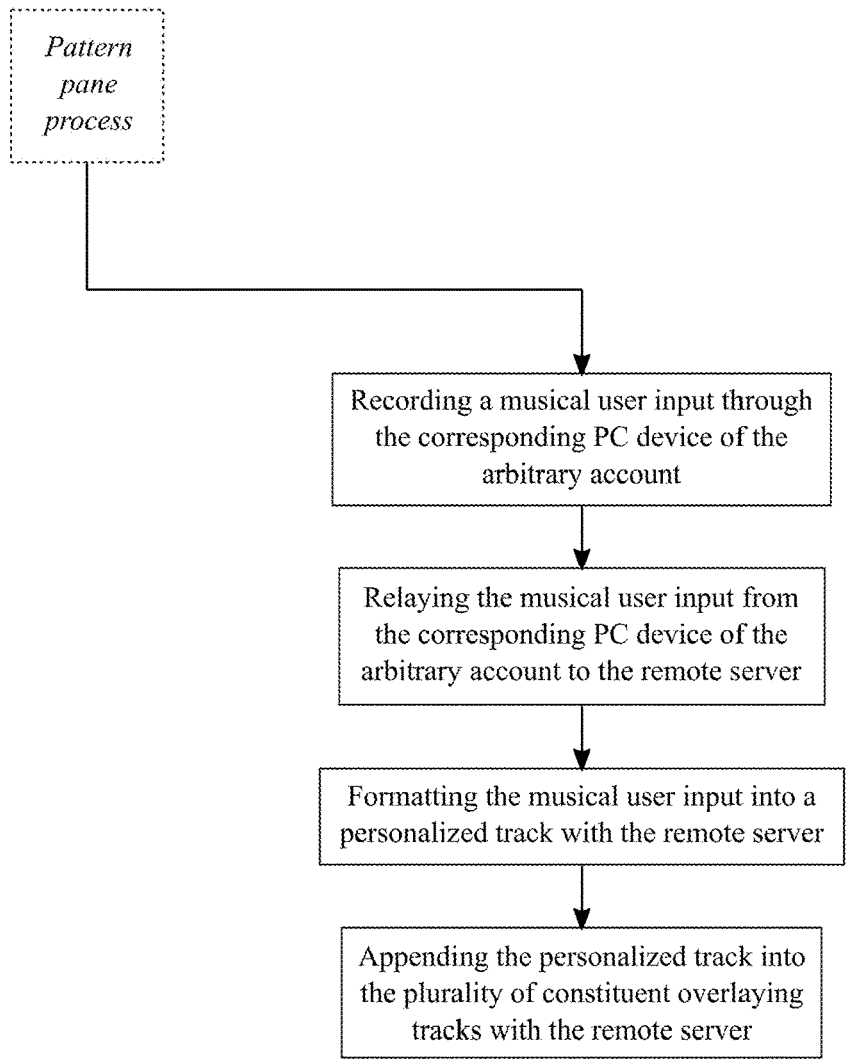
FIG. 7 is a flowchart illustrating a sub-process of appending a musical user input into the constituent overlaying tracks.

As can be seen in FIG. 7, another way to append new soundtracks into the music project is to record a musical user input through the corresponding PC device of the arbitrary account. The musical user input can be, but is not limited to, an audio recording or the audio portion of a video captured by the microphone of a person's smart-phone or a touch-screen input of a graphical piano shown on a person's smart-phone. Once the musical user input is relayed from the corresponding PC device of the arbitrary account to the remote server, the remote server formats the musical user input into a personalized track. The personalized track is a soundtrack that has been formatted to audibly integrate into the music project. Consequently, the remote server can then append the personalized track into the plurality of constituent overlaying tracks, which also audibly edits the music project of the arbitrary account.

Figure 8:
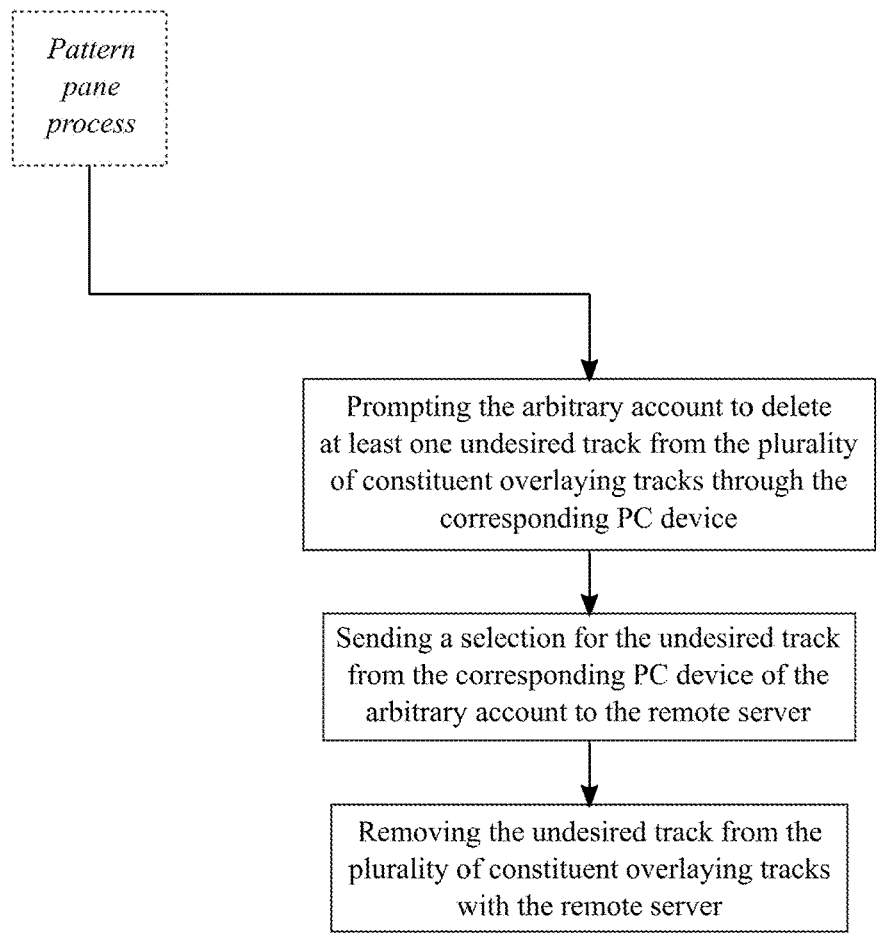
FIG. 8 is a flowchart illustrating a sub-process of deleting an unwanted track from the constituent overlaying tracks.

As can be seen in FIG. 8, another feature of the pattern pane allows for unwanted soundtracks to be removed from the existing set of constituent overlaying tracks. Thus, the corresponding PC device prompts the arbitrary account to delete at least one undesired track from the plurality of constituent overlaying tracks. Once a selection for the undesired track is sent from the corresponding PC device of the arbitrary account to the remote server, the remote server removes the undesired track from the plurality of constituent overlaying tracks, which also audibly edits the music project of the arbitrary account. The contrast between appending and deleting specific tracks from the plurality of constituent overlaying tracks allows the users of the arbitrary account and the collaboration account to finely tune the resulting sound of the music project.

Figure 9:
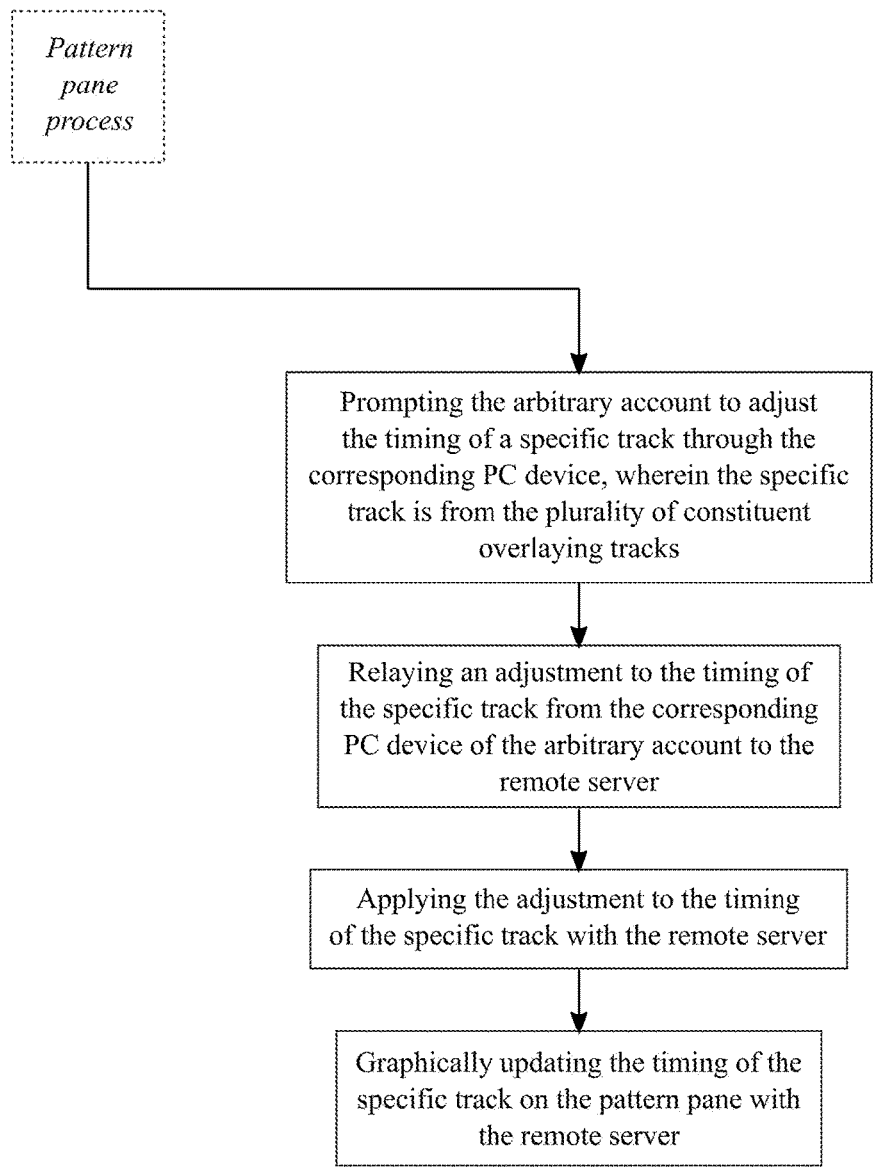
FIG. 9 is a flowchart illustrating a sub-process of adjusting the timing for any track from the constituent overlaying tracks.

As can be seen in FIG. 9, another feature of the pattern pane allows a user to audibly edit the music project by selectively changing the timing of any of the constituent overlaying tracks. Thus, the corresponding PC device prompts the arbitrary account to adjust the timing of a specific track from the plurality of constituent overlaying tracks. Once an adjustment to the timing of the specific track is relayed from the corresponding PC device of the arbitrary account to the remote server, the remote server applies the adjustment to the timing of the specific track, which audibly edits the music project of the arbitrary account. In order to simultaneously keep the users of the arbitrary account and the collaborator account up-to-date on the current progress of the music project, the remote server graphically updates the timing of the specific track on the pattern pane.

Figure 10:
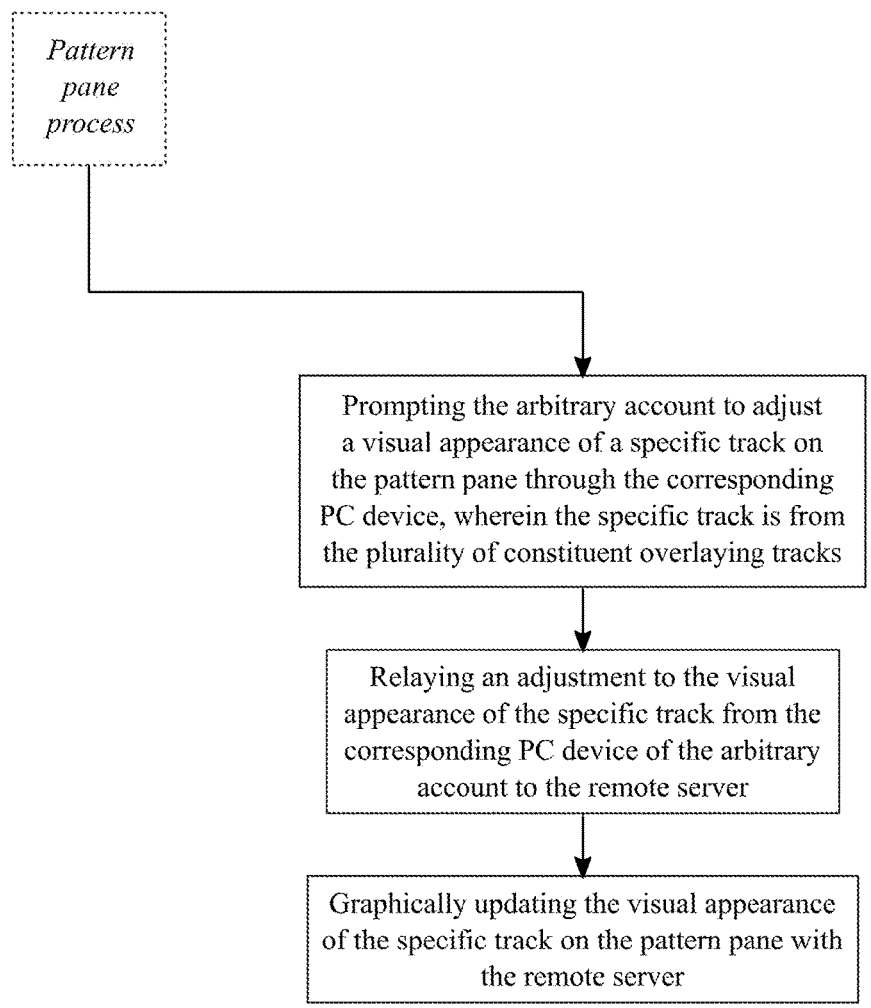
FIG. 10 is a flowchart illustrating a sub-process of adjusting the visual appearance for any track from the constituent overlaying tracks, wherein the visual appearance is adjusted while displaying the pattern pane.

As can be seen in FIG. 10, another feature of the pattern pane allows a user to change a visual appearance of any of the constituent overlaying tracks, which can be done for aesthetic purposes or to notify other users with something about the specific track (e.g. red for notifying that the specific track needs to be removed, or yellow for notifying that the specific track adds an upbeat sound to the music project, etc.). Thus, the corresponding PC device prompts the arbitrary account to adjust the visual appearance of a specific track on the pattern pane, wherein the specific track is from the plurality of constituent overlaying tracks. Once an adjustment to the visual appearance of the specific track is relayed from the corresponding PC device of the arbitrary account to the remote server, the remote server graphically updates the visual appearance on the pattern pane, which allows users of the arbitrary account and the collaborator account to simultaneously view the new visual appearance of the specific track through their corresponding PC devices.

Figure 11:
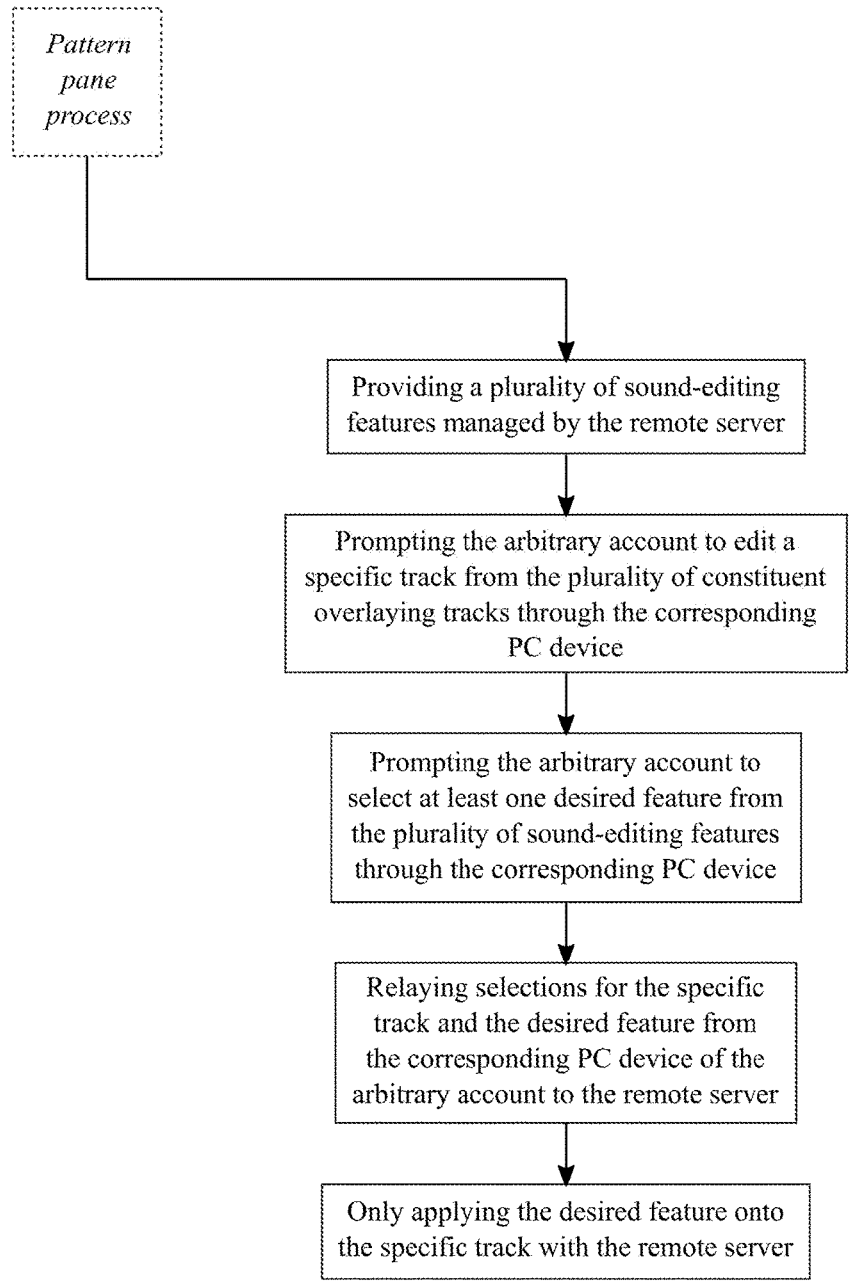
FIG. 11 is a flowchart illustrating a sub-process of applying a sound-editing feature on any track from the constituent overlaying tracks.

As can be seen in FIG. 11, another feature of the pattern pane allows a user to audibly edit the music-project by modifying a specific track from the plurality of constituents overlaying tracks. The remote server needs to be provided with a plurality of sound-editing features, which includes, but is not limited to, adjusting the volume level for a specific track, adjusting the equalization of a specific track, or adjusting the FX of a specific track. Thus, the corresponding PC device prompts the arbitrary account to edit a specific track from the plurality of constituent overlaying tracks. The corresponding PC device also prompts the arbitrary account to select at least one desired feature from the plurality of sound-editing features. Once selections for the specific track and the desired feature is relayed from the corresponding PC device of the arbitrary account to the remote server, the remote server only applies the desired feature onto the specific track, which also audibly edits the music project of the arbitrary account.

Figure 12:
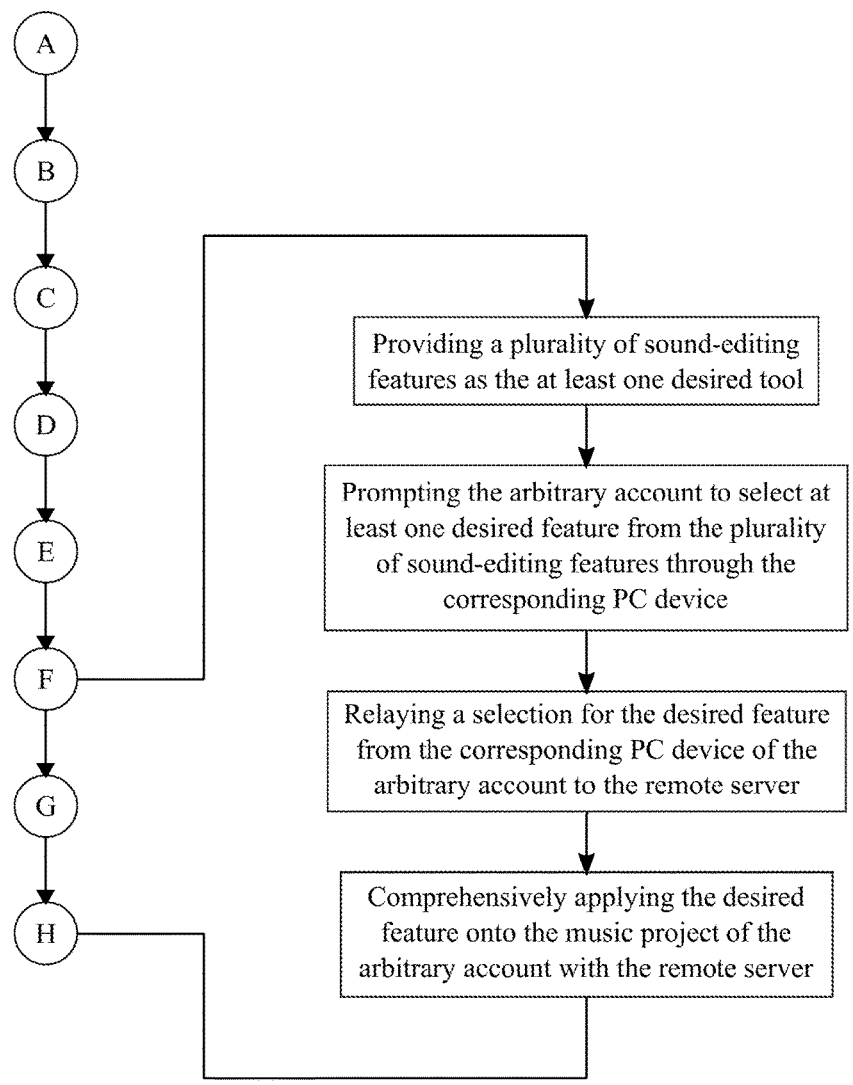
FIG. 12 is a flowchart illustrating a sub-process of applying a sound-editing feature on the entire music project.

As can be seen in FIG. 12, another sub-process followed by the method of the present invention provides the plurality of sound-editing features as the at least one desired tool, which allows the sound-editing feature to be applied to the entire music project instead of a specific track from the plurality of constituent overlaying tracks. For example, the present invention can apply "classic chamber", "echo doubler", or "punchy rap" as sound-editing features to be applied to the entire music project. Thus, the corresponding PC device similarly prompts the arbitrary account to select at least one desired feature from the plurality of sound-editing features. Once a selection for the desired feature is relayed from the corresponding PC device to the remote server, the remote server comprehensively applies the desired feature onto the music project of the arbitrary account, which audibly edits the music project for the arbitrary account.

Figure 13:
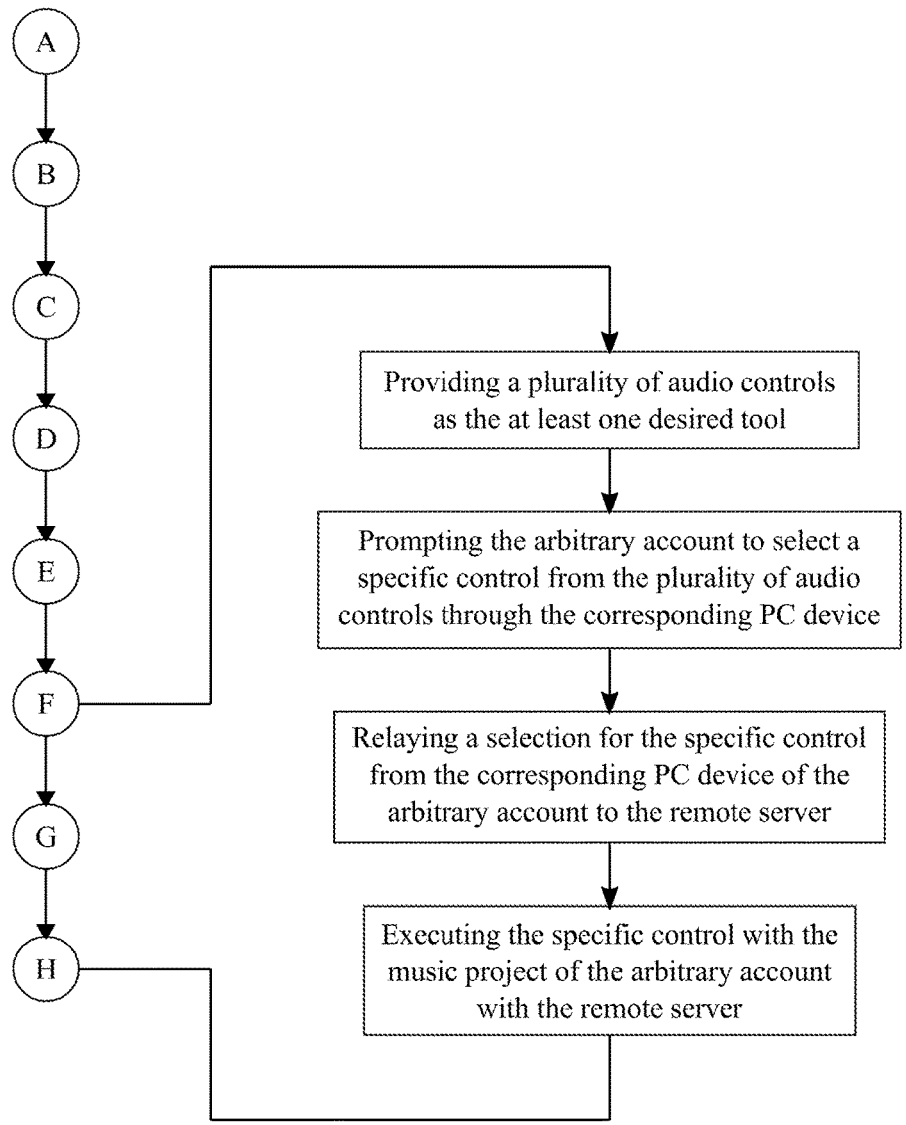
FIG. 13 is a flowchart illustrating a sub-process of executing an audio control on the music project.

As can be seen in FIG. 13, another sub-process followed by the method of the present invention provides a plurality of audio controls as the at least one desired tool. The audio controls are executable commands to play, stop, pause, rewind, fast-forward, etc. Thus, the corresponding PC device prompts the arbitrary account to select a specific control from the plurality of audio controls. Once a selection for the specific control is relayed from the corresponding PC device of the arbitrary account to the remote server, the remote server executes the specific control with the music project of the arbitrary account, which allows the users of the arbitrary account and the collaborator account to controllably listen the music project.

Figure 14:
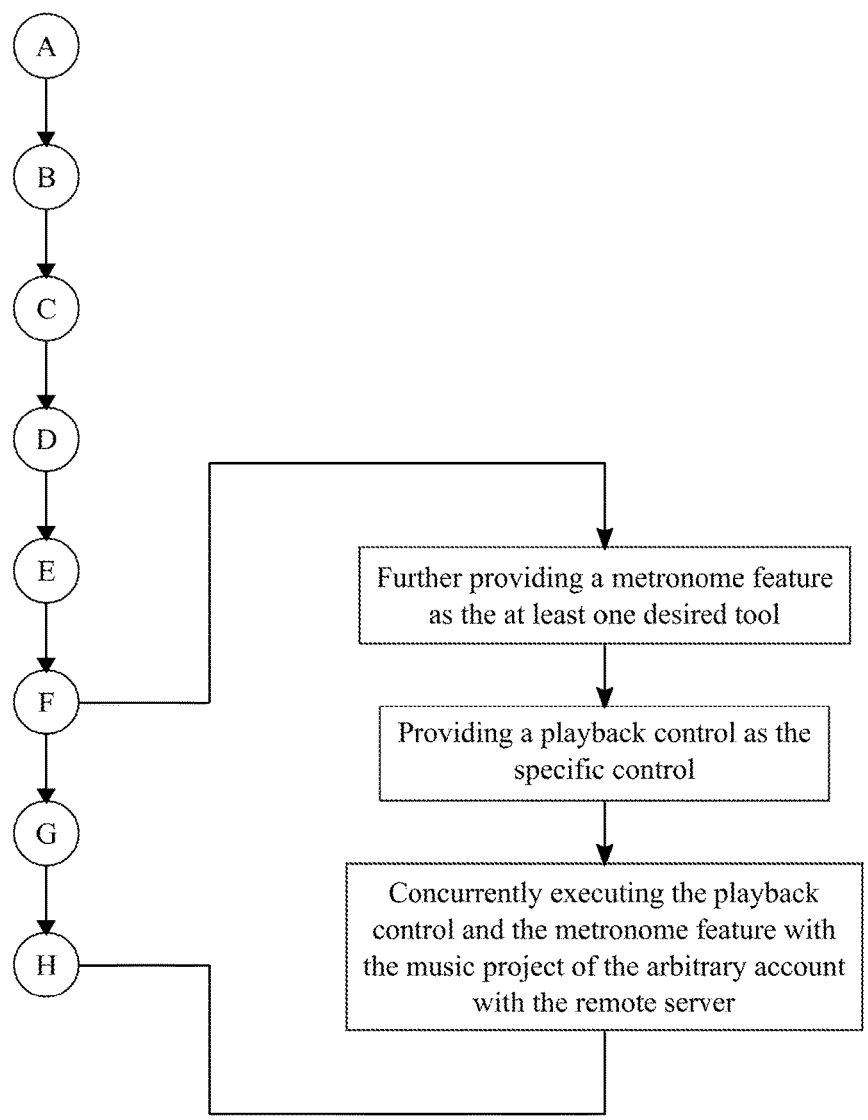
FIG. 14 is a flowchart illustrating a sub-process of implementing a metronome feature while playing back the music project.

As can be seen in FIG. 14, another sub-process followed by the method of the present invention further provides a metronome feature as the at least one desired tool, which is used in conjunction with the plurality of audio controls. If a playback control is the desired control from the plurality of audio controls, then the remote server is able to concurrently execute the playback control and the metronome feature with the music project of the arbitrary account. The playback control is meant to play the music project from beginning to end with the corresponding PC devices of the arbitrary account and the collaborator account. The metronome feature is a periodic click that is audibly superimposed onto the playback of the music project, which allows the users of the arbitrary account and the collaboration account are analytically listen to the timing of the music project.

Figure 15:
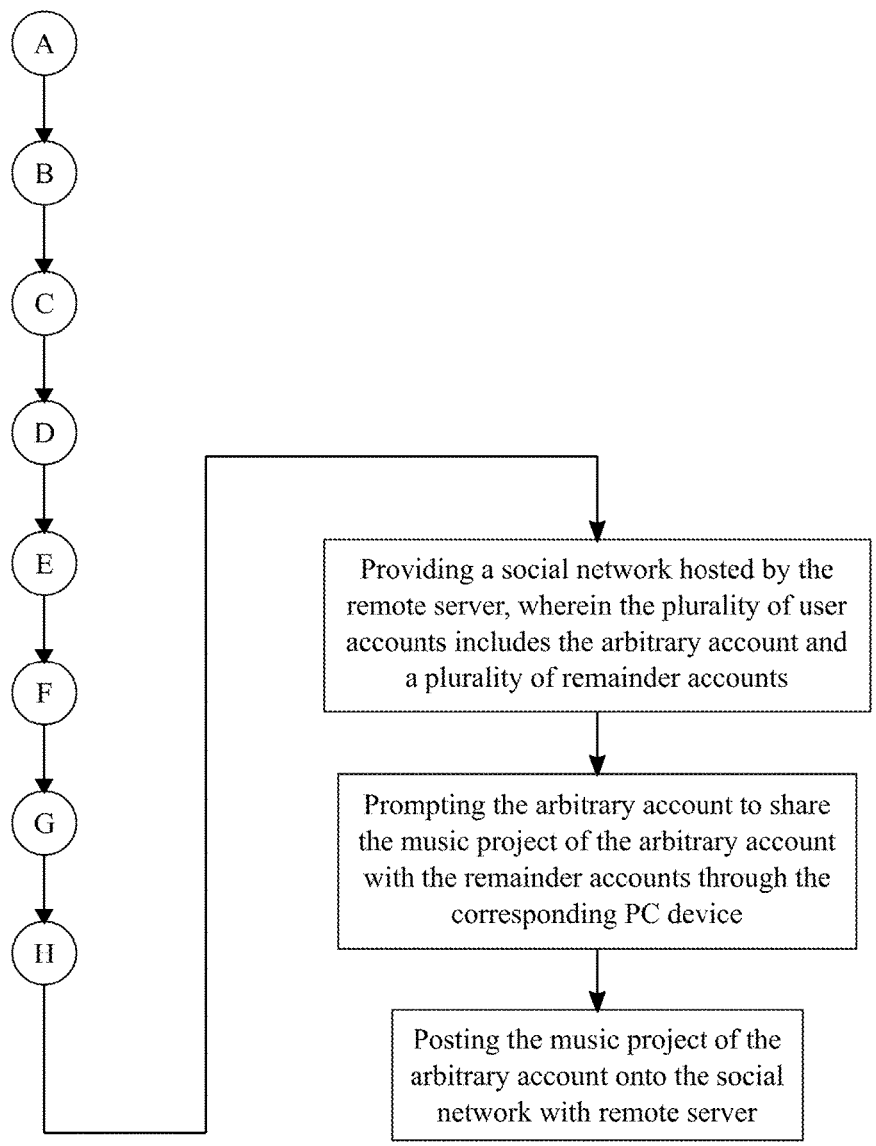
FIG. 15 is a flowchart illustrating a sub-process of allowing an originator to post their music project on a social network.
Figure 16:
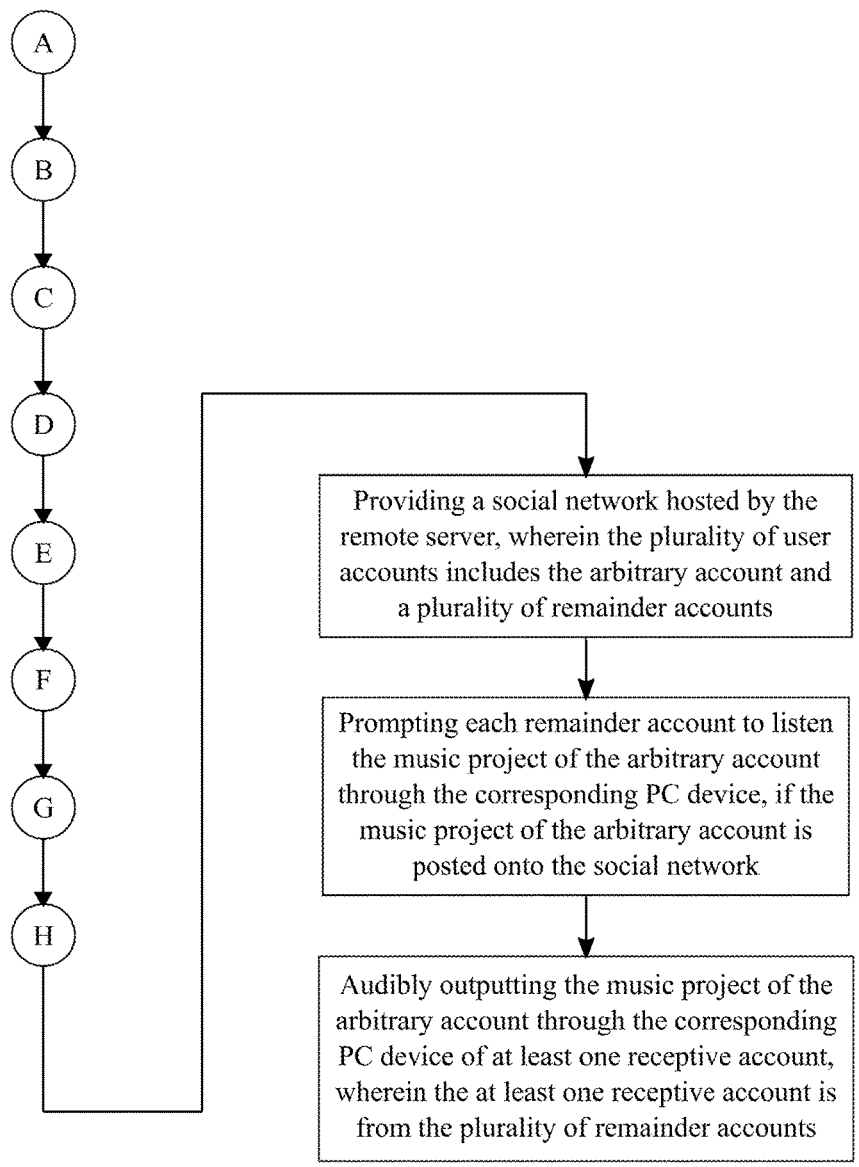
FIG. 16 is a flowchart illustrating a sub-process of allowing other users to selectively listen to posted music projects through the social network.

As can be seen in FIGS. 15 and 16, another present invention also manages a social network hosted by the remote server, which allows user accounts that are not associated with the arbitrary account or the collaborator account to communicate constructive feedback on the music project. If the plurality of user accounts is separated into the arbitrary account and a plurality of remainder accounts (i.e. a set of user accounts that are not the arbitrary account), then the corresponding PC device is able to prompt the arbitrary account to share its music project with the remainder accounts in order to receive constructive feedback from users of the remainder accounts. Once the arbitrary account agrees to share its music project with the remainder accounts, the remote server posts the music project of the arbitrary account on the social network. After the music project of the arbitrary account is posted and is accessible on the social network, the corresponding PC device prompts each remainder account to listen the music project of the arbitrary account. At least one receptive account from the plurality of remainder accounts is the user account of someone that agrees to listen to the music project of the arbitrary account, and, consequently, the corresponding PC device of the receptive account audibly outputs the music project of the arbitrary account. This allows to the user of the receptive account to provide constructive feedback to the user of the arbitrary account through the present invention.

Although the invention has been explained in relation to its preferred embodiment, it is to be understood that many other possible modifications and variations can be made without departing from the spirit and scope of the invention as hereinafter claimed.

What is claimed is:

1. A method of collectively producing music comprising steps of:
   (A) providing a plurality of user accounts managed by at least one remote server, wherein each user account is associated with a corresponding personal computing (PC) device and at least one music project;
   (B) providing a plurality of audio-editing tools managed by the at least one remote server;
   (C) prompting each user account to select at least one collaborator account from the plurality of user accounts with the corresponding PC device;
   (D) relaying a selection for the collaborator account from the corresponding PC device of an arbitrary account to the at least one remote server, wherein the arbitrary account is any one of the plurality of user accounts;
   (E) hosting a communication platform between the arbitrary account and the collaborator account through the at least one remote server;
   (F) prompting the arbitrary account to select at least one desired tool from the plurality of audio-editing tools with the corresponding PC device;
   (G) relaying a selection for the at least one desired tool from the corresponding PC device of the arbitrary account to the at least one remote server;
   (H) modifying the at least one music project of the arbitrary account in accordance to the at least one desired tool with the at least one remote server, the arbitrary account and the collaborator account simultaneously having ability to modify the at least one music project so as to achieve real-time collaboration;
   providing a pattern pane as the at least one desired tool;
   providing a plurality of constituent overlaying tracks for the at least one music project of the arbitrary account;
   prompting the arbitrary account to adjust a visual appearance of a specific track on the pattern pane through the corresponding PC device, wherein the specific track is from the plurality of constituent overlaying tracks, wherein the visual appearance of the specific track is a color of the specific track;
   relaying an adjustment to the visual appearance of the specific track from the corresponding PC device of the arbitrary account to the at least one remote server; and
   graphically updating the visual appearance of the specific track on the pattern pane with the at least one remote server by changing the color of the specific track.

2. The method as claimed in claim 1 comprising steps of:
   providing a message board as the communication platform;
   displaying a live feed of the message board to the corresponding PC device of the arbitrary account and the corresponding PC device of the collaborator account;
   prompting the arbitrary account to enter a feedback message through the corresponding PC device;
   posting the feedback message of the arbitrary account on the message board with the at least one remote server, if the arbitrary account enters the feedback message into the corresponding PC device;
   prompting the collaborator account to enter a feedback message through the corresponding PC device; and
   posting the feedback message of the collaborator account on the message board with the at least one remote server, if the collaborator account enters the feedback message into the corresponding PC device.

3. The method as claimed in claim 1 comprising steps of:
   graphically outputting a timing for each constituent overlaying track on the pattern pane through the corresponding PC device of the arbitrary account; and
   graphically outputting the timing for each constituent overlaying track on the pattern pane through the corresponding PC device of the collaborator account.

4. The method as claimed in claim 1 comprising steps of:
   providing a plurality of communal soundtracks stored on the at least one remote server;
   prompting the arbitrary account to select at least one desired track from the plurality of communal soundtracks through the corresponding PC device;
   relaying a selection of the at least one desired track from the corresponding PC device of the arbitrary account to the at least one remote server; and
   appending the at least one desired track into the plurality of constituent overlaying tracks with the at least one remote server.

5. The method as claimed in claim 1 comprising steps of:
   providing a plurality of personal soundtracks stored on the corresponding PC device of the arbitrary account;
   prompting the arbitrary account to select at least one desired personal track from the plurality of personal soundtracks through the corresponding PC device;
   sending the at least one desired personal track from the corresponding PC device of the arbitrary account to the at least one remote server; and
   appending the at least one desired personal track into the plurality of constituent overlaying tracks with the at least one remote server.

6. The method as claimed in claim 1 comprising steps of:
   recording a musical user input through the corresponding PC device of the arbitrary account;
   relaying the musical user input from the corresponding PC device of the arbitrary account to the at least one remote server;
   formatting the musical user input into a personalized track with the at least one remote server; and
   appending the personalized track into the plurality of constituent overlaying tracks with the at least one remote server.

7. The method as claimed in claim 1 comprising steps of:
   prompting the arbitrary account to delete at least one undesired track from the plurality of constituent overlaying tracks through the corresponding PC device;
   sending a selection for the at least one undesired track from the corresponding PC device of the arbitrary account to the at least one remote server; and
   removing the at least one undesired track from the plurality of constituent overlaying tracks with the at least one remote server.

8. The method as claimed in claim 1 comprising steps of:
   prompting the arbitrary account to adjust the timing of the specific track through the corresponding PC device;

relaying an adjustment to the timing of the specific track from the corresponding PC device of the arbitrary account to the at least one remote server;

applying the adjustment to the timing of the specific track with the at least one remote server; and graphically updating the timing of the specific track on the pattern pane with the at least one remote server.

9. The method as claimed in claim 1 comprising steps of:

providing a plurality of sound-editing features managed by the at least one remote server;

prompting the arbitrary account to edit the specific track from the plurality of constituent overlaying tracks through the corresponding PC device;

prompting the arbitrary account to select at least one desired feature from the plurality of sound-editing features through the corresponding PC device;

relaying selections for the specific track and the at least one desired feature from the corresponding PC device of the arbitrary account to the at least one remote server; and only applying the at least one desired feature onto the specific track with the at least one remote server.

10. The method as claimed in claim 1 comprising steps of:

further providing a plurality of sound-editing features as the at least one desired tool;

prompting the arbitrary account to select at least one desired feature from the plurality of sound-editing features through the corresponding PC device;

relaying a selection for the at least one desired feature from the corresponding PC device of the arbitrary account to the at least one remote server; and comprehensively applying the at least one desired feature onto the at least one music project of the arbitrary account with the at least one remote server.

11. The method as claimed in claim 1 comprising steps of:

further providing a plurality of audio controls as the at least one desired tool;

prompting the arbitrary account to select a specific control from the plurality of audio controls through the corresponding PC device;

relaying a selection for the specific control from the corresponding PC device of the arbitrary account to the at least one remote server; and executing the specific control with the at least one music project of the arbitrary account with the at least one remote server.

12. The method as claimed in claim 11 comprising steps of:

further providing a metronome feature as the at least one desired tool;

providing a playback control as the specific control; and concurrently executing the playback control and the metronome feature with the at least one music project of the arbitrary account with the at least one remote server.

13. The method as claimed in claim 1 comprising steps of:

providing a social network hosted by the at least one remote server, wherein the plurality of user accounts includes the arbitrary account and a plurality of remainder accounts;

prompting the arbitrary account to share the at least one music project of the arbitrary account with the remainder accounts through the corresponding PC device; and posting the at least one music project of the arbitrary account onto the social network with the at least one remote server.

14. The method as claimed in claim 1 comprising steps of:

providing a social network hosted by the at least one remote server, wherein the plurality of user accounts includes the arbitrary account and a plurality of remainder accounts;

prompting each remainder account to listen the at least one music project of the arbitrary account through the corresponding PC device, if the at least one music project of the arbitrary account is posted onto the social network; and audibly outputting the at least one music project of the arbitrary account through the corresponding PC device of at least one receptive account, wherein the at least one receptive account is from the plurality of remainder accounts.

* * * * *